Oct. 16, 1945.　　　　P. WOLFERS　　　　2,387,104
ORIENTING DEVICE
Filed Dec. 9, 1940

INVENTOR
PHILIP WOLFERS
BY
ATTORNEY

Patented Oct. 16, 1945

2,387,104

UNITED STATES PATENT OFFICE 2,387,104

ORIENTING DEVICE

Philip Wolfers, New York, N. Y., assignor of one-third to I. Newton Brozan, Aaron Holman, and J. Stanley Halperin, all of New York, N. Y.

Application December 9, 1940, Serial No. 369,159

8 Claims. (Cl. 33—222.)

This invention relates to orienting devices.

One of the objects of my invention is to provide an orienting device which shall greatly facilitate aerial and marine navigation.

Another object of my invention is to provide an orienting device by means of which a pair of synchronized strip maps which show the same territory, but which are drawn to different scales, may be used to simplify aerial and marine navigation.

Another object of my invention is to provide a device of the character described in which a pair of strip maps of the character described move in parallel directions under a pair of aligned apertures, and in which the maps are so distorted that a predetermined route will always be visible through said apertures.

A further object of my invention is to provide an improved orienting device of the character described which shall comprise relatively few parts, shall be simple to operate, and which, at the same time, shall possess a high degree of efficiency in use.

Other objects of my invention will in part be obvious and in part hereinafter pointed out.

Certain features shown and described but not claimed in this application are shown, described and claimed in my copending application for Orienting device, Serial No. 359,200, filed October 1, 1940.

The invention accordingly consists in the features of construction, combinations of elements, and arrangement of parts which will be exemplified in the construction hereinafter described, and of which the scope of application will be indicated in the claims.

In the accompanying drawing, in which is shown one of the various possible embodiments of my invention, Fig. 1 is a plan view of an ordinary small scale map indicated a route which is desired to be traversed;

Figure 1:
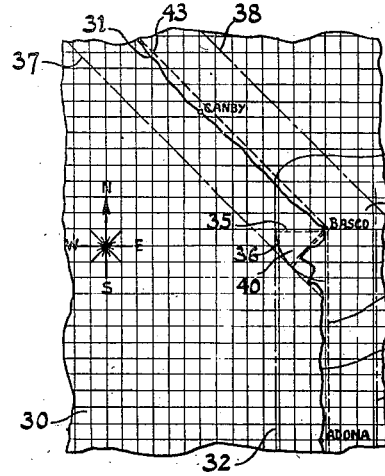

Referring now to the drawing, 10 is an orienting device embodying my invention and comprising a box-like housing 11 having a cover 12 removably attached thereto in any suitable manner, as by means of a plurality of screws 13 which threadedly engage lugs on the side walls of the housing 11.

Suitably supported within the housing 11, as by a spool assembly such as that described in my copending application Serial No. 359,200, are a pair of strip maps A and B, generally similar to the maps shown and described in said copending application. Said maps are drawn to different scales. Thus map A is a small scale map which shows in general outline a predetermined route to be traversed, and map B, which is a large scale map, shows in greater detail local landmarks along said predetermined route.

By way of example, map A may be drawn to a scale of five miles to an inch, so that if a portion of this map five inches long is exposed at least twenty-five miles of the route will be visible to a person employing the device, and he will be able to determine his location with respect to the next few towns ahead and any towns and points of possible interest to him in his general vicinity. If a corresponding five inch portion of map B, which may be drawn to a scale of one mile to the inch, is exposed it will represent a strip five miles long along the route to be traversed. This map B will illustrate landmarks in correspondingly greater detail.

Each of the maps A and B is mounted on a pair of flanged spools 14 which are journaled at one end on the side walls of the housing 11 and supported at the other end on a one-way, friction-slip, driving mechanism 15 which is actuated from a gear box 16. Said gear boxes are interconnected through a clutch 17 having an externally disposed actuating handle 18, so that said maps A and B may be synchronously driven at a ratio of speeds which is inversely proportional to the scale of the maps. In the illustrated example map A which is drawn to a scale of five miles to the inch will be driven at one-fifth of the speed of map B which is drawn to a scale of one mile to the inch.

The maps and gear trains may be moved in any suitable manner, as manually, by means of either of a pair of knobs 19, or automatically as by means of an integrator (not shown) responsive to the velocity of the mobile craft in which my orienting device is installed.

If the strip maps A and B are of considerable length I may employ a sprocket drive, such as shown in my copending application, to insure accurate synchronization of the maps A and B, and at the same time use the friction-slip driving mechanism 15 as take-up devices.

Viewing apertures 20 and 21, of sufficient size to show an appreciable area of surrounding territory, are formed in the cover 12. Said apertures may be provided with transparent panes 22 and 23, one of which 22, disposed over map A, may have a small square 24 centrally outlined therein and is so dimensioned that it encloses on the small scale map A an area equal to that shown through the apertures 21 disposed over the large scale map B. A pair of centrally disposed, aligned hair-lines 25 and 26 may also be provided in the panes 22 and 23 to indicate corresponding points on the two strip maps.

In employing my orienting device 10, the maps A and B are first synchronized by throwing out the clutch 17 and independently moving each map A and B by means of its knob 19 until corresponding portions of said maps are under the hair-lines 25 and 26. For this purpose special markings, preferably in an outstanding color such as red, may be provided on each map to indicate identical sites. After the maps have been thus initially synchronized the clutch 17 is thrown in and the device is ready for use. Subsequent rotation of either of the knobs 19 will then move the maps A and B at such a predetermined ratio of speeds that corresponding portions of both maps will constantly lie under the hair-lines 25 and 26 and within the areas defined by the square 24 and aperture 21. In this manner a traveler may, with the aid of the local landmarks on the large scale map B, continually shift said map so that the portion disposed under the hair-line 26 will indicate his location. If an integrator is employed variations in speed occasioned by head and tail winds may be corrected by intermittently referring to map B. At the same time, the traveler's location on the small scale map A will be indicated by the hair-line 25 so that he may constantly check his orientation and position with respect to the various towns and localities which lie ahead of and around him.

As the maps A and B are of limited width and, during operation of the orienting device 10, travel in fixed parallel paths under the apertures 20 and 21, in the event that the route to be traversed departs appreciably from a straight line of travel, special means must be provided to cause all portions of the route to lie within the confines of the strip and to pass under said apertures. In accordance with my invention I provide two such means, each of which is specially adapted for use with one of the strip maps A and B.

Referring first to the construction of the small scale strip map A, in Fig. 1 I have shown an ordinary flat projection map 30 in which the heavy solid line 31 represents a route desired to be traversed between two towns, Adona and Canby, by way of a third town, Basco, which does not lie on the straight lines between said first two towns. I prefer to have the map 30 drawn to the same scale as that ultimately to be used in the small scale strip map A, although a different scale may be employed and proper compensation later made therefor.

Figure 2:
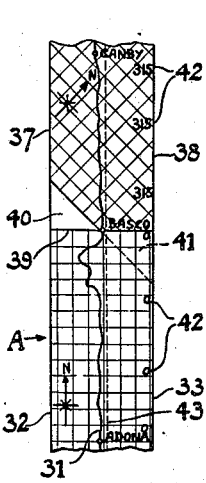
Fig. 2 is a small scale strip map constructed in accordance with my invention from the map shown in Fig. 1.

A pair of parallel lines 32 and 33 are drawn through points lying to either side of Adona. Said lines are spaced apart a distance equal to the width of the final strip A, that is, of substantially the same width as that of the aperture 20 with which the map A is adapted to be associated. The direction of the lines 32 and 33 with respect to the route 31 is such that a maximum length of route and all landmarks and points of interest lying reasonably close to the route on both sides thereof, will be disposed between said lines. An arbitrary point (in this instance Basco) situated on the route 31 is then chosen, which lies near the point of intersection 34 of the route 31 and one of the boundary lines 32 and 33, and which is approximately closest to the mid-point between said boundary lines. A perpendicular 35 is next dropped to one of the boundary lines and an arc 36 of the length of the perpendicular 35 is swung about the selected point of the route (Basco) as center. Another pair of boundary lines 37 and 38, similar to the lines 32 and 33, is then drawn on both sides of the next portion of the route (Basco to Canby). One of the lines 37, which lies on the same side of the selected point (Basco) as the boundary line 32 to which the perpendicular 35 was dropped, is drawn tangent to the arc 36. The portions of the route 31 between the boundary lines are then cut from the original map 30 and rearranged in proper order with the boundary lines 32 and 37 and 33 and 38 disposed on the same side of the route 31 and in alignment as shown in Fig. 2. To avoid confusion and maintain uniformity at the junction between two sections of the strip map A, originally defined by pairs of angularly disposed boundary lines, the end 39 of the section nearest the starting point (Adona) is made perpendicular to its boundary lines 32 and 33 and at the adjacent end of the next succeeding section the duplicated portion 40 and overlapping portion 41 are trimmed away. If desired, the compass orientation of the boundary lines may be indicated along the margin of the strip map as by the numerals 42.

It will be apparent that in a strip map A constructed in accordance with the procedure above outlined, all portions of the route, landmarks, and points of interest on both sides of said route will be disposed within the confines of said strip and will be so positioned that they will pass beneath said aperture. Also, the route will be represented by a line which is unbroken at the juncture of two adjacent sections.

If the strip map A is to be used for aerial or marine navigation, the route to be traversed (except over very long distances) may be represented by straight lines 43 and the various boundary lines 32, 33, 37 and 38 will be drawn parallel to the several portions of said route.

It should be noted that the latitude and longitude lines of adjacent sections on the strip are angularly disposed with respect to each other, thus visibly indicating the exact point where map distortion occurs and additionally showing to aerial or marine navigators the place where a change of direction must be made.

The distortions of the strip map A for maintaining all parts of the route beneath the aperture in the orienting device 10 must be duplicated on the large scale strip map B, as the maps A and B are to be constantly kept in synchronism. However, due to the narrow width of territory depicted by the large scale strip map B and to the meandering course of many roads, it will often be found that portions of the route 31, although wholly within the confines of the small scale strip map A, will lie without the boundary lines 50 and 51 (Fig. 3) of the large scale strip map B. In this event it is necessary to so distort the projecting portions 52 of the route 31 that they will pass beneath their associated aperture 21 and will lie wholly within the confines of the strip B without disturbing the synchronism and scale relationship of the maps A and B in their direction of movement. I accomplish this by uniformly distorting the projecting portions 52 in a direction perpendicular to the boundary lines 50 and 51.

Figure 3:
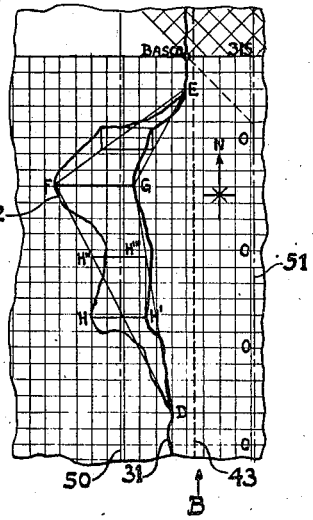
Fig. 3 is a large scale strip map of a portion of the route shown in Fig. 1 and constructed in accordance with my invention.
Figure 4:
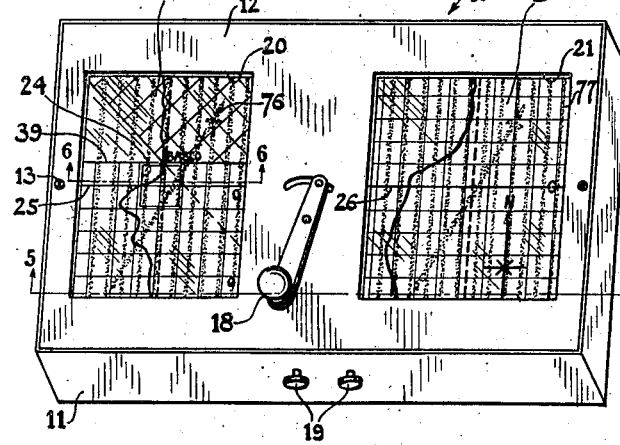
Fig. 4 is a perspective view of an orienting device embodying my invention and adapted for use with the map shown in Figs. 2 and 3.
Figure 6:
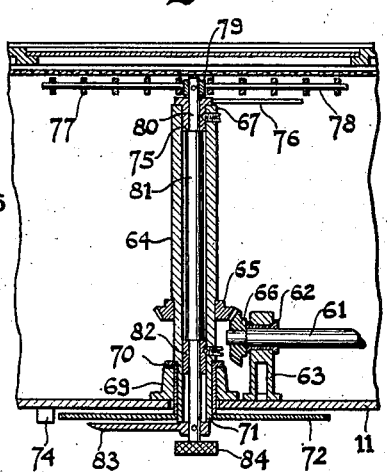
Fig. 6 is an enlarged sectional view taken substantially along the line 6—6 of Fig. 4.
Figure 5:
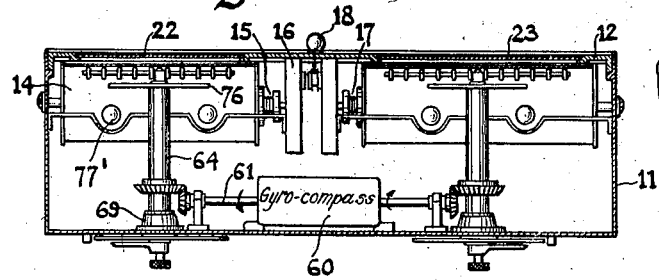
Fig. 5 is a sectional view taken substantially along the line 5—5 of Fig. 4.

Referring to Fig. 3, this is effected by selecting two arbitrary points D and E along the route 31 which lie one on each side of the projecting portion 52 and are disposed well within the boundary lines 50 and 51. Another arbitrary point F is chosen, which, for convenience, as will soon be apparent, should be the point on the projecting portion 52 which is furthest from the boundary lines. A last arbitrary point G is selected which lies on a line FG perpendicular to the boundary lines 50 and 51, and which will represent the distorted position of the point F. To locate the distorted position of any other point on the route between D and E, I now draw straight lines DF, DG, EF, and EG. The distorted position of point H is now obtained by drawing the line HH' from H perpendicular to the boundary lines 50 and 51, running a line HH'' parallel to the boundary lines from H to the outer sloped line DF, running another line H''H''' parallel to HH' from H'' on DF to H''' on DG and finally running the line H'''H' from H''' until it intersects HH' at H', the distorted position of point H. It may be shown by similar triangles that the distortion of all points on the route 31 between D and F is proportional to the distance of each point from a base line running through D and parallel to the boundary lines 50 and 51. The distortion of all points from F to E is likewise proportional to their distance from a base line running through E.

It will thus be seen that I have constructed a uniformly distorted large scale map on which all portions of a route to be traversed will pass beneath its associated aperture 21 and will lie wholly within the confines of its boundary lines, and which map can be kept in synchronism with a small scale map not so distorted without providing any additional elements in the orienting device 10.

The angular distortion of the strip maps A and B, set forth above in detail in connection with map A, is of great assistance in aerial and marine navigation when used in combination with an adjustable orienting needle now to be described. Identical needles are used with each of the maps A and B so that it will suffice to describe only the needle associated with the map A.

Mounted on the base of the housing 11 is a gyro-compass 60 which actuates a projecting shaft 61 in accordance with the orientation of said compass. Said shaft 61 is journaled in a bearing 62 supported in a standard 63 and drives a hollow shaft 64 through a pair of bevel gears 65 and 66. The shaft 64 is perpendicular to the portion of the map A located between the spools 14, and its upper end 67 is disposed below the center of such portion. A hollow step bearing 69 rotatably supports the shaft 64 at a reduced part 70 thereof and permits the lower shaft end 71 to extend beyond the bottom of the housing 11 through a disc 72 attached to the shaft end. Numerals 73 inscribed on said disc 72 denote compass directions. A marker 74 is provided to indicate orientation of the compass 60, and the disc 72 is so angularly disposed in relation thereto that a compass indication number 73 opposite said marker will indicate the direction of movement of the mobile craft in which my orienting device 10 is situated.

Fixedly mounted in the upper end of the shaft 64 is a hollow plug 75 which carries a compass needle 76. Said needle 76 is arranged to make the same angle relative to the direction of movement of the map A as the angle which the mobile craft makes with the north. Lights 77 disposed below the needle 76 casts the needle's shadow on the translucent map A. In this manner the compass needle will visually indicate on the map A the instantaneous angle between north and the direction of movement of the mobile craft.

Associated with the compass needle 76 are a plurality of spaced parallel orienting needles 77 which are adapted to show the instantaneous deviation of the direction of travel of the mobile craft from the route desired to be traversed. Said needles 77 are very thin so as to cast only a hair-line shadow on the strip map A and are held immediately below the surface of said map by a crossbar 78 which is mounted in a collar 79. The collar is attached to the upper reduced end 80 of a shaft 81 disposed within the hollow shaft 64. Said shaft 81 is journaled at its upper end in the bore of the plug 76 and at its lower end in a sleeve 82 fixed within said hollow shaft 64. The shaft 81 projects beyond the end of the shaft 65 and is provided on said projection portion with a pointer 83 and knurled operating knob 84. Said shaft 81 is in light frictional engagement with the bearing surface of the plug 75 and sleeve 82 so that the shaft 81 will turn with the shaft 64, but may be rotated independently of the shaft 64 by manipulation of the knob 84.

It will thus be seen that the orienting needles 77 may be adjustably disposed in angular relationship relative to the compass needle 76, whereupon any angular movement of the compass needle 76 will be duplicated by the orienting needles 77.

Assume now that it is desired to employ my orienting device 10 to proceed on an aerial bombing mission from Adona to Canby, and that at an intermediate rendezvous Basco, not on a direct line between Adona and Canby, a protecting squadron is to be picked up. The direction from Adona to Basco will be assumed to be due north and from Basco to Canby northwest. The strip map A in such event will have the appearance of the map shown in Fig. 2, the second section thereof having the lines of latitude and longitude at an angle of 45° with the boundary lines 37 and 38 of said strip and with the route 43 to be traversed (indicated by dotted lines).

Figure 7:
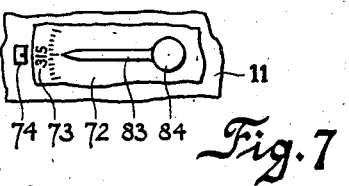
Fig. 7 is a fragmentary view of a dial and a pointer employed in my orienting device to aid in indicating whether the proper course of travel is being followed.

When the aeroplane carrying the orienting device starts its flight from Adona, in a northerly direction, examination of the disc 72 will disclose that the zero numeral 73 thereof will be disposed opposite the marker 74. The knob 84 is then manipulated to cause the pointer 83 to be in registry with said zero numeral on the disc 72, whereby the orienting needles 77 will be disposed in parallel relationship to the compass needle 76. As long as the aeroplane continues to proceed due north the shadow of the compass needle 76 and orienting needles 77 will be parallel to the direction of movement of the strip map A and therefore to the route being traversed, said route being disposed so as to lie parallel to the boundary lines 37 and 38. When Basco has been reached and the escort picked up, the aeroplane will turn in a northwesterly direction, whereupon the disc 72 will swing as shown in Fig. 7 until the numeral 315° lies opposite the marker 74. The knob 84 is then manipulated to cause the pointer 83 to be disposed opposite the numeral 73 which indicates the direction of travel, in this instance 315°. The orienting needles 77 will thus be positioned at an angle of 315° (45°) to the compass needle 76 and the shadow of said orienting needles 77 will be disposed parallel to the direction of flight of the craft. A plurality of needles is employed so that the shadow of at least one of them will be close to the route 43 being traversed. In this manner all the pilot or navigator need do to keep the craft in its proper line of flight is to observe the relationship between the route 43 and the shadow of the orienting needles 77 closest to said route. By maintaining the route and the needle 77 in parallelism the aeroplane will be kept in the desired direction of travel.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. An orienting device of the character described comprising a plate having a viewing aperture, a strip map disposed beneath said aperture, means to move said map past said aperture, a shaft whose angular position is a function of the angular orientation of said device, an orienting needle rotatable with said shaft and in registry with said aperture whereby the position of said needle relative to said map may be observed, and means to vary the angular relationship between said orienting needle and said shaft.

2. An orienting device of the character described comprising a plate having a viewing aperture, a strip map disposed beneath said aperture, means to move said map past said aperture, a compass needle, an orienting needle rotatable with said compass needle, both said needles being in registry with said aperture whereby the position of said needles relative to said map may be observed, and means to vary the angular relationship between said orienting needle and said compass needle.

3. An orienting device of the character described comprising a plate having a viewing aperture, a strip map whereon the route desired to be traversed by a mobile craft is straight and parallel to the side edges of said map, means to move said map past said aperture, a shaft whose angular position is a function of the angular orientation of said device, an orienting needle rotatable with said compass shaft and in registry with said aperture whereby the position of said needle relative to said map may be observed, and means to vary the angular relationship between said orienting needle and said shaft whereby said orienting needle may be so disposed as to indicate on said map the direction of travel of said mobile craft relative to said route.

4. An orienting device of the character described comprising a plate having a viewing aperture, a strip map of a route to be traversed by a mobile craft, said route comprising a plurality of angularly disposed straight portions, said map being so distorted that the route consists substantially of a single straight line parallel to the side edges of said map, said line comprising all of said angularly disposed straight portions, means to move said map past said aperture, a shaft whose angular position is a function of the angular orientation of said device, an orienting needle rotatable with said shaft and in registry with said aperture whereby the position of said needle relative to said map may be observed, and means to vary the angular relationship between said orienting needle and said shaft whereby said orienting needle may be so disposed as to indicate on said map the direction of travel of said mobile craft relative to said route.

5. An orienting device of the character described comprising a plate having a viewing aperture, a strip map of a route to be traversed by a mobile craft, said route comprising a plurality of angularly disposed straight portions, said map being so distorted that the route consists substantially of a single unbroken straight line parallel to the side edges of said map, said line comprising all of said angularly disposed straight portions, means on said map to indicate the parts of said straight line representing the different straight portions of said route, means to move said map past said aperture, a shaft whose angular position is a function of the angular orientation of said device, an orienting needle rotatable with said shaft and in registry with said aperture whereby the position of said needle relative to said map may be observed, and means to vary the angular relationship between said orienting needle and said shaft whereby said orienting needle may be so disposed as to indicate on said map the direction of travel of said mobile craft relative to said route.

6. An orienting device of the character described comprising a plate having a viewing aperture, a strip map of a route to be traversed by a mobile craft, said route comprising a plurality of angularly disposed straight portions, said map being so distorted that the route consists substantially of a single unbroken straight line parallel to the side edges of said map, said line comprising all of said angularly disposed straight portions, means on said map to indicate the parts of said straight line representing the different straight portions of said route, means to move said map past said aperture, a pair of concentric shafts, means responsive to the angular orientation of said device to move the first of said shafts, a compass needle associated with said first shaft and in registration with said aperture to visibly indicate a northerly direction on said map relative to said route, means to cause the second of said shafts to rotate with said first shaft, means to vary the angular relationship between said first and said second shafts, and an orienting needle associated with said second shaft and in registration with said aperture to indicate on said map the direction of movement of said mobile craft relative to said route.

7. An orienting device of the character described comprising a plate having a viewing aperture, a strip map of a route to be traversed by a mobile craft, said route comprising a plurality of angularly disposed straight portions, said map being so distorted that the route consists substantially of a single unbroken straight line parallel to the side edges of said map, said line comprising all of said angularly disposed straight portions, means on said map to indicate the parts of said straight line representing the different straight portions of said route, means to move said map past said aperture, a hollow first shaft, a second shaft disposed within said first shaft, bearing means in said first shaft to rotatably support said second shaft in a light frictional engagement, said second shaft projecting beyond both ends of said first shaft, a compass needle and indicating dial mounted on opposite ends of and rotatable with said first shaft, an orienting needle and a pointer mounted on opposite ends of and movable with said second shaft, means responsive to the angular orientation of said device to move said first shaft, manually manipulatable means to rotate said second shaft relative to said first shaft, said needles being in registry with said aperture, and means to indicate the angular position of said compass needle and said orienting needle on said map, whereby said compass needle will show on said map a northerly direction relative to said route, and said orienting needle will show on said map the direction of movement of said mobile craft relative to said route.

8. An orienting device of the character described comprising a plate having a viewing aperture, a strip map disposed beneath said aperture, means to move said map past said aperture, a shaft whose angular position is a function of the angular orientation of said device, an orienting needle, means interconnecting said needle and said shaft to vary the angular position of said needle to correspond to changes in angular position of said shaft, the outline of said needle being visible through said aperture whereby the position of said needle relative to said map may be observed, and means to vary the angular relationship between said orienting needle and said shaft.

PHILIP WOLFERS.